United States Patent
Helstern

(10) Patent No.: US 7,312,434 B1
(45) Date of Patent: Dec. 25, 2007

(54) METHOD OF FILTERING SPECTRAL ENERGY

(75) Inventor: Robert P. Helstern, Irvine, CA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/645,461

(22) Filed: Dec. 26, 2006

(51) Int. Cl.
*H01J 3/14* (2006.01)
*G02B 1/00* (2006.01)

(52) U.S. Cl. .................. 250/226; 359/350; 359/885
(58) Field of Classification Search .............. 250/216, 250/226; 359/350, 885, 887
See application file for complete search history.

(56) References Cited

U.S. PATENT DOCUMENTS

| 5,644,124 A * | 7/1997 | Hamada et al. ............. 250/216 |
| 7,142,375 B2 * | 11/2006 | Nikolov et al. ............. 359/722 |
| 2005/0013025 A1 * | 1/2005 | Saitoh ........................ 359/891 |

* cited by examiner

*Primary Examiner*—John R. Lee
(74) *Attorney, Agent, or Firm*—Boyle Fredrickson S.C.

(57) ABSTRACT

A method is provided for suppressing a predetermined portion of an optical spectrum emanating from a light emitter. The optical spectrum illuminates an illumination area. The method includes the steps of fabricating a filter having a spectrophotometric transmittance and varying the spectrophotometric transmittance of the filter. The filter is positioned between the light emitter and the illumination area, such that the filter absorbs the predetermined portion of the optical spectrum.

21 Claims, 6 Drawing Sheets

METHOD OF FILTERING SPECTRAL ENERGY

FIELD OF THE INVENTION

This invention relates generally to night vision technology, and in particular, to a method of filtering spectral energy in order to provide a night vision friendly environment for military applications and the like.

BACKGROUND AND SUMMARY OF THE INVENTION

As is known, night vision technology involves the collection of natural light in the lower portion of the infrared light spectrum and the artificial amplification of that natural light to such a point that images residing in the natural light can be readily observed. Based in part on Einstein's photoelectric theory, the modern Night Vision Device (NVD) enables a user to view objects, essentially in the dark. NVDs can amplify the light from the night sky by a factor of 30,000 times or more.

To effectively utilize a NVD, a user must subject the NVD to natural nighttime radiant intensity levels. These intensity levels may occur as a result of direct or indirect moonlight or starlight, or alternatively, by the deliberate production of artificial lighting that emulates the spectral irradiance of the night sky within the confines of an area that is normally not exposed to moonlight or starlight. It is known that the night sky exhibits a normal starlight spectral energy distribution in the 450 nanometer to 900 nanometer range of the electromagnetic spectrum. The spectral energy that resides from the 600 nanometer to 900 nanometer region is typically the area of sensitivity and amplification of the NVD.

Due to the advancements in image intensifier technology, the sensitivity and resolution of NVDs has improved greatly over the past few years. As a result, the role of NVDs, particularly within the military, has been expanding rapidly. For example, there exists a need for NVDs to work in concert with the artificial lighting that serves as the basis for backlighting liquid crystal display (LCD) generated graphics or for interior lighting within a crew station or a work area.

There are generally two classifications of artificial light emitting devices. The first classification is commonly referred to as a compatible spectral emission of an emitter. The compatible spectral emission of an emitter is defined as a non-NVD interacting spectral distribution of a light source wherein the spectral emission of the light source is outside the area of sensitivity of the NVD. Hence, the artificial light emitting device emits light that is apparent to the human eye, but not apparent to an observer using a NVD. This classification is generally referred to as Class A Night Vision Compatibility. The second classification is referred to as a tolerant spectral emission of a light source. The tolerant spectral emission of the light source is defined as a NVD interacting spectral distribution of the light source wherein a portion of the spectral emission of the light source is within the area of sensitivity of the NVD. Since the spectral distribution of the light source is within of sensitivity of the NVD, both the wearer of the NVD and a non-wearer of the NVD are able to distinguish the light source. This second classification is also generally referred to as Class B Night Vision Compatibility. It is noted, however, that the Class B NVD wearer can only detect levels of intensity of a tolerant light source and image contrast. Hence, the NVD wearer cannot detect the color of the light while observing the highly amplified scene.

The light sources that are considered compatible to both Class A and Class B NVDs are generally white light sources that have been converted through a series of optical filters to trim the normal spectral distribution of a light source to minimize the radiant energy in the 600 nanometer to 930 nanometer region of the electromagnetic spectrum. Class B NVD tolerant light sources are designed to interact with the NVD such that an observer utilizing the Class B NVD can safely view these sources of light as part of the amplified image of the NVD. The level of radiant energy emitted by these so-called friendly emitters do not interact in such a way as to activate the automatic gain control of the NVD and to interfere with the NVD's image resolution or performance. As is known, long-term, continuous exposure to high levels of NVD tolerant light levels will induce degradation to the image intensifier and shorten the life of the NVD. NVD friendly emitters can be fashioned into several colored emitters such as yellow for caution display functions and red for warning display functions.

The amount of allowable light energy that passes through the NVD to the observer can be quantified and is known as Night Vision Radiant Intensity (NRi) units. NRi units are defined as the integral of the curve generated by multiplying the spectral radiance or irradiance of the modified light source by the relative spectral response of the particular NVD used. It should be noted that excessive NRi units or light energy passing through the NVD may distort or alter the normal performance of the NVD and may cause the automatic gain control circuitry of some NVDs to activate, thereby rendering the device blind.

Most NVDs incorporate a phosphor screen to display the images to be observed by the wearer. It should be further noted that the amount of light energy allowed to transfer through the NVD relates directly to the overall brightness of the monochromatic fluorescent image produced by the phosphor screen. The level of the image brightness is important as not to cause nighttime blindness to an observer's eye after becoming dark-adapted. The luminance differences between the output of the phosphor screen and the un-amplified outside scene of the natural world must remain reasonably small to insure the best visual compatibility possible when compensating for the slower adaptation and luminous efficiency of the dark adapted eye, particularly if intense fluorescence was emanating from the phosphor screen.

Automatic gain control (AGC) is a method inclusive to some NVDs to allow the management of offending NRi where the luminous intensity level of the source of light energy is either too reflective or too emissive in nature. Since excessive light levels can cause permanent damage to the phosphor screen, management of these light levels by active AGC circuitry causes the image intensifier tubes to be reduced in their overall sensitivity to the incoming light resulting in a less intense image that is presented to the dark-adapted human eye. AGC will compensate for higher levels of ambient light, and in particular, to those levels of light energy in the area of sensitivity of the NVD. However, any light energy which activates the AGC will reduce the sensitivity of the NVD and cause poor image reproduction by the NVD. In extreme cases, the light energy may cause the AGC to shut down the NVD, thereby rendering the NVD blind to the outside world.

It should be noted that excessive NRi present within the amplified scene could induce an effect known as blooming. Blooming occurs when a NVD is exposed to a source of light that has not been corrected for excessive NRi. This source of light causes an intense brightness reproduction within the amplified scene of the NVD such that the resolution of the NVD is greatly reduced. This, in turn, destroys reproduction of the image of the outside scene by the NVD. If the NVD is being used in connection with the piloting air or watercraft, the hazards of blooming or temporary blindness are obvious.

The amount of NRi tolerated by these NVDs is based on the class and type of the particular NVD deployed and the kind of light emitter(s) selected. By way of example, the class and type of a NVD that is deployed for the use with a light emitter that produces a spectral emission outside the region of spectral sensitivity of the NVD (hereinafter referred to as a "non-NVD interacting light emitter") would have an NRi value no greater than 1.0 E-10 as an order of magnitude when the emitter is providing a brightness level not exceeding 0.1 foot lamberts. It should be understood that a light emitter exhibiting this level of energy would not be detected or seen in the highly amplified scene produced by the NVD. For example, the non-NVD interacting light emitter may take the form of an advisory light, which is primarily observed by a non-NVD wearer and tends to be bluish green in color.

Similarly, the class and type of NVD deployed necessitate the use of NVD interacting light emitters that can be detected through the NVD without activating the AGC of this class and type of NVD. For example, a light emitter such as an emergency or warning light must be visible through the NVD for prompt action by a crewmember. In extreme applications of tolerant NRi, the level of NRi values can reach 1.0E-05 as an order of magnitude. It should be understood that tolerant NRi threshold values for caution and warning light emitters for Class B NVDs must at least generate 1.0E-09 to assure detectability through the Class B NVD. However, it is particularly advantageous to reduce the tolerant NRi level of a light emitter as much as possible where it is applicable.

In some applications, it is desirable to provide a large scale, area contained Night Vision Friendly (NVF) environment for enclosed compartments without windows. For the purposes of this discussion, a NVF environment is understood as the environment of the total interaction of confined light energy emitters whose spectral characteristics are well matched to perform a unified function as to artificially illuminate or cause to illuminate an immediate area to support vision amplification devices. It should be understood that light energy from an overhead source would interact with light energy transmitted from an electro-optical display particularly when both spectral emissions reach the human eye at the same time. Accordingly, the combined NRi levels of both source emitters must be compatible with the particular class and type of NVD deployed.

It should be recognized that the illumination of an interior compartment must provide adequate illumination to perform work. The definition of the illumination must include the appropriate brightness levels and subsequent chromatic characteristics to perform the work safely. However, more importantly, the illumination must not exhibit offensive NRi levels such that the light energy generated activates the AGC of the NVD when deployed within the enclosed compartment.

While the access doors of an enclosed compartment are usually closed, it can be appreciated that the doors must be occasionally opened for maintenance or the like. It can be appreciated that during the course of conducting night operations, the illumination characteristics of an NVF environment must not offend any NVD present if the compartment doors are breached. It should be further recognized that the control of the light energy signature that emanates from the various light emitters from military ships would be effective in reducing the propensity of detection by enemy NVD equipped personnel while at sea and mitigating the risk of piloting aircraft near or about the vicinity of the ship while aviators deploy NVDs.

To accomplish an NVF environment, optical filtering is usually required to suppress a substantial amount of light energy within the 600 nanometer to 930 nanometer range of the electromagnetic spectrum. This is also the portion of the electromagnetic spectrum to which the NVD is most sensitive. It can be appreciated that any spectral emitter converted to night vision compatibility (NVC) producing adequate energy throughout the visible electromagnetic spectrum would cause a predominate color shift in the spectral radiance of the artificial white light source.

It should be understood that a deliberate truncation of the visible spectrum (400 nm to 760 nm) of a light source to accommodate suppressing the region of NVD sensitivity beginning either at wavelengths 625 nm for Class A NVDs or 665 nm for Class B NVDs would result in the departure from the original or unfiltered polychromatic spectra of the light source. It should be further recognized that perceived changes in the color as well as the transreflective nature of the light source would be a function of the degree of suppression to the contributing wavelengths that compose the original polychromatic spectra. Hence, changes affecting the original spectral emission of the light source and associated chromatic expression of the source would be influenced either by suppression or elimination of the wavelengths that predominately influence the shade and color dominance of a white light source.

The tristimulus response of a light source and the sum of its corresponding ratios of blue, green and red spectral energies are generally the predominate factors that determine the degree of purity of the color generated by the light source. Any relatively unequal alteration of the source spectra by a filter will inherently induce changes in the perceived color of the light source and, of course, the illuminated scene. It should also be understood that transreflectivity characteristics of objects and light emitters would also be changed, notwithstanding the non-NVD wearer's ability to distinguish approximate object color rendering while illuminated, by truncated source irradiance. Further, any transmitted colors from electro-optical equipment would also provide the same difficulty to the observer.

If the departure from the original color spectra from the source were significant, then the ability for an observer to distinguish definitive reflective color in objects, specifically those whose spectral responses that lie beyond the truncated region, would be difficult. It is also apparent that subtle differences in transmitted color or colored images would also cause a non-NVD wearer to be less sensitive to subtle changes that occur during the presentation of displayed graphics or other types of annunciation by electro-optical means.

As a result, the efficiency of the lighting system and true display color generation after conversion would be compromised due to the suppression of light energy in the 600 nanometer to 760 nanometer region of the visible spectrum. Due to the absence of yellow, orange and red spectral components, the optical energy produced by the spectral emitters when transmitting light energy below 600 nanometers would be predominately bluish green in color. Hence, the successful suppression of this bandwidth results in the extremely low illumination intensity of a desired area by the light source, as well as, the generation of light having a blue to green color.

By way of example, New et. al., U.S. Pat. No. 6,515,413 discloses a method and apparatus that filters infrared light from fluorescent lighting and that is adapted to typical fluorescent lighting and assemblies. The apparatus includes a filter assembly comprising a transparent, cylindrical tube with a diameter and length slightly greater than those of a fluorescent tube. A cap may be placed on each end of the tube. Each cap is perforated to receive the electrical contacts of the fluorescent tube. The electrical contacts pass through the cap and can engage the electrical connections of a fluorescent fixture. Gaskets are placed between the caps and the ends of the fluorescent tube and prevent light from escaping through the perforations in the cap.

As described, the light source described in the '413 patent produces an output irradiance wherein the illumination intensity of the output irradiance is significantly less than is necessary for working environment and wherein the color of the illumination is green. The illumination level required to assure appropriate NVD usage is typically not greater than 5 foot candles. It can be appreciated that the lack of overall illumination intensity and the modification of the color of a light source may give rise to certain problems. More specifically, modification of the color of light produced by a light source may alter non-NVD wearers visual acuity and their ability to recognize colored objects, such as a crew member's ability to read colored maps/diagrams or to distinguish color coded wiring. As a result, safety issues may arise in certain situations where visual impairment by individuals tasked to perform work within the illuminated zone is to be expected. For example, crewmembers may be unable to properly recognize various warning and caution placards which are normally designed to reflect red, orange and yellow colored information while under normal white light illumination. However, due to the absence of sufficient yellow, orange and red spectral energy emanating from the modified light source will render red, orange and yellow colored objects or transreflective information unrecognizable.

Further, it can be appreciated that it is necessary to provide cooperative filtration on display equipment to further promote NVD compatibility within the NVF environment created by the NVF overhead lighting. In many military command and operations work/crew stations, many electro-optical displays utilize either Cathode Ray Tube (CRT) based technology or Liquid Crystal Display technology (LCD) to generate multi-colored graphics. However, the night vision radiant intensity (NRi) from any unfiltered local light emitter such as a CRT or LCD display within the NVF environment would defeat the NVF illumination environment and interfere with the NVD.

It is understood that there is a need to provide night vision compatibility (NVC) of a multi-color generating display and retain to some degree, enough spectral energy to reproduce yellow, orange and red spectral components to preserve non-NVD wearer's ability to see and distinguish colored information without compromising the NRi limits of the interfaced NVD or offend the NVF illumination environment. Furthermore, the condition of joint compatibility is also needed for every local light emitter present and active within the enclosed NVF illumination environment for any electro-optical device that generates a monochromatic or full color emission. It is further contemplated that additional safe guards of compatibility are required if the NVF environment was situated in an open compartment. It should be understood that an open compartment includes a workstation that requires the ability for a crewmember to view a scene of the outside world through a window or portal. Again, it is further contemplated that to provide the necessary security against detection from the outside world from enemy NVD and to provide NVC to friendly aviators or other crewmembers while deploying NVDs in close proximity to the compartments.

Therefore, it is a primary object and feature of the present invention to provide a method for generating night vision compatible illumination of an area.

It is a further object and feature of the present invention to provide a method for generating night vision compatible illumination of an area that does not cause a loss in resolution or sensitivity of the images observed by a wearer of a night vision device.

It is a still further object and feature of the present invention to provide a method for generating night vision compatible illumination of an area that allows an individual in the illuminated area without NVD to recognize reflected colors under all brightness operating conditions ranging from approximately 5 to 200 foot candles.

It is a still further object and feature of the present invention to provide a method for generating night vision compatible illumination of an area wherein the area is sufficiently illuminated for daytime usage, normal nighttime usage without NVDs and night operations with NVDs.

It is a still further object and feature of the present invention to provide a method for generating night vision compatible illumination of an area that does not interfere with ability of a wearer of a night vision device to recognize self-illuminating warning signals, or a non-NVD wearer from recognizing reflective colored placards, or reflective colored emergency exit signs.

It is a still further object and feature of the present invention to provide a method for generating night vision compatible illumination of an area that is fabricated from a material that is better than glass at resisting breakage.

In accordance with the present invention, a method is provided for suppressing a predetermined portion of an optical spectrum emanating from a light emitter. The method includes the step of fabricating a filter to absorb the predetermined portion of the optical spectrum. The filter has a spectrophotometric transmittance. Thereafter, the spectrophotometric transmittance of the filter is varied.

The step of fabricating the filter includes the step of forming a sheet of material having a predetermined cross sectional thickness. The sheet is fabricated from a polymer incorporating a series of colorants and infrared absorbing dyes. It should be understood that incorporating colorants within the sheet allows for minor chromatic correction for specific applications such as tinting or to create the influence of a saturated color if desired. It is contemplated that a multitude of variants could be derived from manipulation and modification of the basic colorant.

The step of varying spectrophotometric transmittance of the filter includes the step of removing a portion of the cross sectional thickness of the sheet. The sheet is partially defined by first and second surfaces. The step of removing a portion of the cross sectional thickness of the sheet includes the step of cutting the first surface of sheet in a circular pattern so as to define a modified surface. Thereafter, the modified surface may be restored.

It is contemplated for the predetermined portion of the optical spectrum absorbed by the filter to be in the range of 600 nanometers to 900 nanometers and to provide a curvature in the filter.

In accordance with a further aspect of the present invention, a method is provided for suppressing a predetermined portion of an optical spectrum emanating from a light emitter. The optical spectrum illuminates an illumination area. The method includes the steps of fabricating a filter having a spectrophotometric transmittance and varying the spectrophotometric transmittance of the filter. Thereafter, the filter is positioned between the light emitter and the illumination area. The filter absorbs the predetermined portion of the optical spectrum and transmits a predetermined portion of the visible spectrum.

The step of fabricating the filter includes the step of forming a sheet having a predetermined cross sectional thickness. The sheet is fabricated from a polymer incorporating a series of colorants and infrared absorbing dyes. The step of varying the spectrophotometric transmittance of the filter includes the step of removing a portion of the cross sectional thickness of the sheet. The sheet is partially defined by first and second parallel surfaces and the step of removing a portion of the cross sectional thickness of the sheet includes the step of cutting and removing the first surface of sheet in a circular pattern parallel to the second surface so as to provide a modified surface. The modified surface may be restored.

It is contemplated for the predetermined portion of the optical spectrum absorbed by the filter to be in the range of 600 nanometers to 900 nanometers and to provide a curvature in the filter.

In accordance with a still further aspect of the present invention, a method is provided for suppressing a predetermined portion of an optical spectrum emanating from a light emitter. The light emitter illuminates an illumination area. The method includes the step of fabricating a filter having a predetermined cross sectional thickness and a spectrophotometric transmittance. Thereafter, the cross sectional thickness of the filter is reduced. The filter is then placed between the illumination area and the light emitter.

The step of reducing the cross sectional thickness of the filter includes the step of cutting the filter in a circular pattern. The method may also include the additional step of positioning the filter between the light emitter and the illumination area. The filter absorbs the predetermined portion of the optical spectrum and transmits a predetermined portion of the visible spectrum.

It is contemplated for the predetermined portion of the optical spectrum absorbed by the filter to be in the range of 600 nanometers to 900 nanometers and to provide a curvature in the filter.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 10:
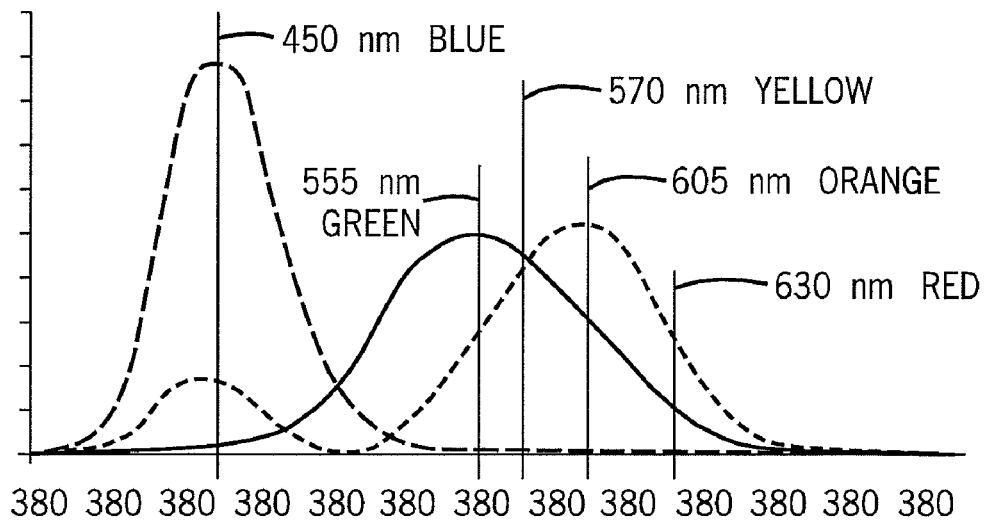
FIG. 10 is a graphical representation of the visible spectrum.

The present invention is directed to an absorption system that incorporates the cooperative filtration of spectral energy in order to provide a night vision friendly environment and a method of fabricating the absorption system. As heretofore described, the area of spectral sensitivity range of a NVD is wavelengths in the range of approximately 600 nanometers to 900 nanometers. Referring to FIG. 10, a graphical representation of the visible spectrum is provided. The intensities of the colors blue, green yellow, orange and red are depicted in relation to their associated wavelengths. The method of the present invention contemplates managing the wavelength and intensity of spectral energy produced by a light emitter by utilizing the absorption system to specifically filter a portion of the optical spectrum where the NVD is most sensitive.

As is known, there are commercially available dyes that can be used to selectively absorb near infrared and infrared light in predetermined concentrations and at predetermined bandwidths. The spectral span of the absorption of these dyes is a typical function of dye concentration and relative solubility. It should also be understood that some dyes manage a broader range of absorption than other dyes even at the same concentration strength. It should be appreciated that greater dye concentrations to improve the span of spectral absorption, may inadvertently cause some absorption at critical spectral wavelengths or regions to be avoided, particularly if it was desired to leave the visible part of the spectrum relatively whole. By consequence, it is known that the use of these dyes formulated to achieve high optical densities to effect near infrared and infrared blockage also produce absorption elsewhere in the visible spectrum. Depending on where the absorption span of the dye is centered will also determine the region of associative transmission losses.

It should be noted that in order to provide adequate absorption for the desired area of near infrared and infrared suppression, a series of these dyes are stacked together forming a more efficient absorption system than utilizing a single dye with significantly higher dye concentration. It should be also understood that associative absorption characteristics and subsequent transmission losses of the set of these dyes are better controlled resulting in better visible light transmission while effectively blocking the NVD sensitivity region.

Figure 8:
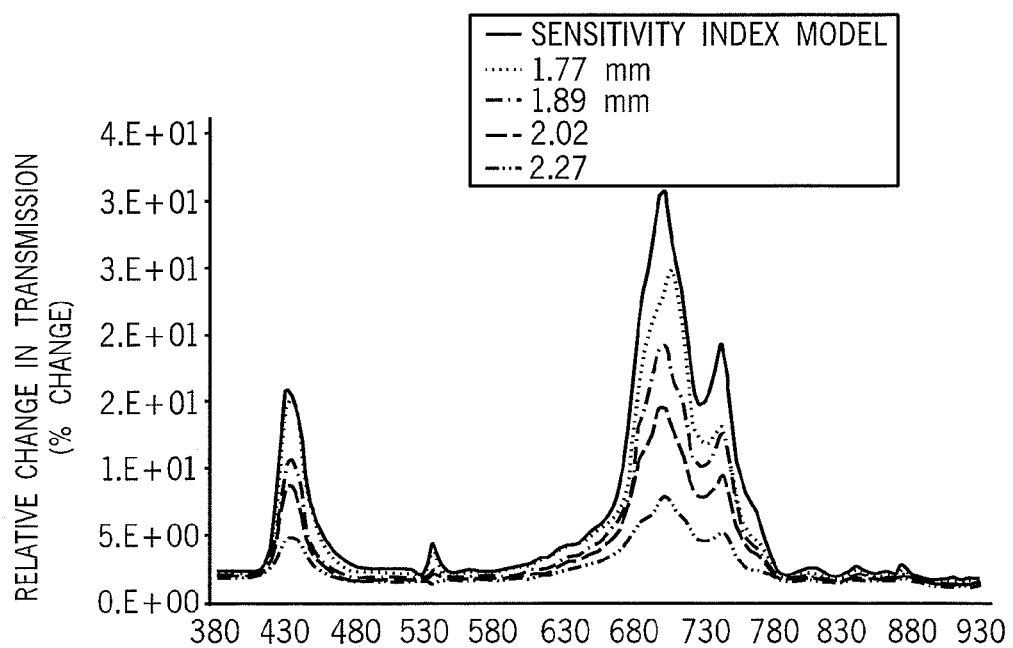
FIG. 8 is a graphical depiction of the spectral transmission characteristics of various thicknesses of a filter fabricated from a polymeric optical medium with selective absorption versus the wavelengths of an optical spectrum.

In order to vary the optical density and affect changes in the visible portion of the spectrum, it is contemplated to vary the filter's ability to attenuate visible light from a given spectral emitter. For example, to avoid perceived color dominance, it is contemplated to allow controlled levels of spectral energy in wavelengths (e.g. 610 nm, 617 nm and 627 nm) to pass through the filter. As a result, enough orange and red light is transmitted through the filter to counteract the color shift to the original spectral distribution of the light source caused by the initial suppression of the 600 nm to 900 rum region. This is accomplished by scheduled dilution where the cross section thickness is varied as a function of transmittance of wavelengths 610 nm (orange), 617 nm (orange-red) and 627 nm (red) and as a function of NRi. As best seen in FIG. 8, it can be recognized that varying the spectral transmittances at these wavelengths allows for precise control of generated NRi for full color electro-optical display or as a color correction method for light sources that require more or less orange-red energy. It should be understood that in order to manipulate the spectral transmittance of specific wavelengths when optimizing the desired pass; i.e. spectral bandwidth, one must understand where the regions of dye concentration and their corresponding wavelengths as a function of the polymerized cross section lie. It is contemplated that the transmittance of other wavelengths within the spectrum could also be manipulated.

As is known, the spectrophotometric transmittance of a filter is a fixed ratio and spectrally matched to that of a given spectral emitter. As such, the variability of the luminous intensity of the optical energy emanating from the filter is completely influenced by the spectral emitter. That is to say, when the spectral emitter is made to vary its luminous intensity output through external means, the spectral response of the filter remains relatively constant. As such, in order to manipulate the spectrophotometric response of the filter, it is contemplated to either vary the strength of the dyes used to fabricate the filter or perform mechanical dilution of the filter. However, other methods for manipulating the spectrophotometric response of the filter are contemplated as being within the scope of the present invention. By way of example, the spectrophotometric response of the filter may be manipulated by chemical dilution. The concentration of the dye in the filter material may be altered, and thereafter, polymerized to a predetermined cross-sectional thickness. This may require a greater ratio of clear monomer in the material, however the affect on transmittance is the same as in the mechanical dilution process.

Figure 1:
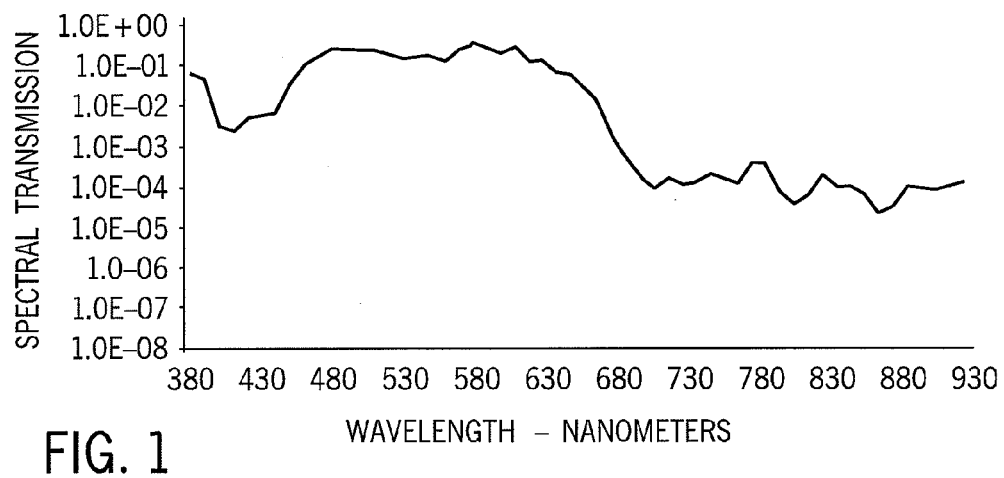
FIG. 1 is a graphical depiction of the spectral transmission of a polymeric optical medium with selective absorption versus the wavelengths of an optical spectrum.
Figure 2:
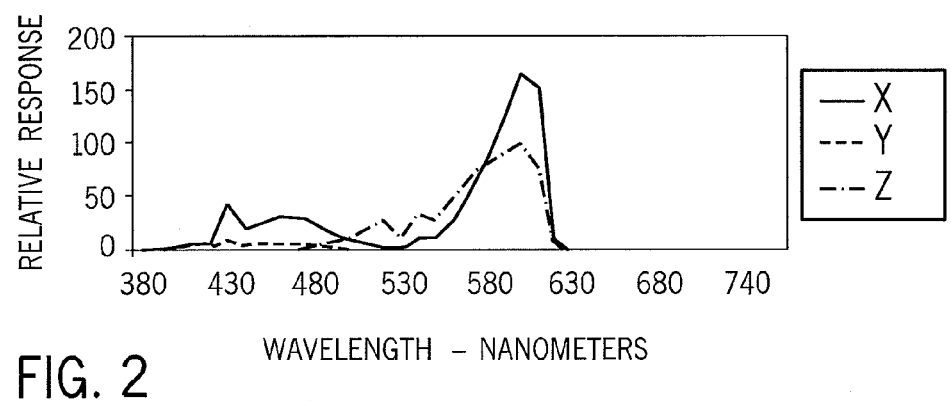
FIG. 2 is a graphical depiction of a tristimulus color response of a polymeric optical medium with selective absorption under fluorescent backlighting versus the wavelengths of an optical spectrum.

In order to provide changes in the desired spectrophotometric transmittance or spectral composition, mechanical dilution is used. As heretofore described, The dilution characteristics of the filter are based on the initial dye composition and strength factors established by a predefined spectral transmission and subsequent formulated optical density. The selections of the dyes are made to correspond with the desired spectral bandwidth to be filtered. Thereafter, a prepolymer mixture incorporating the selected dyes is fabricated and the prepolymer mixture is polymerized to form an initial solid substance. Once the substance has been thermally stabilized, the substance exhibits a basic spectral transmission characteristic, e.g. FIG. 1, and a chrominance tristimulus response, e.g. FIG. 2. As is known, Optical Polymers Lab Corporation of Pawtucket, R.I. is a supplier of the initial solid substance from which the filter hereinafter described is fabricated.

It is noted that the cross sectional thickness of the material from which the filter is fabricated establishes the optical characteristics of the filter, not the particular shape of the material. As such, the material can be formed in either flat or curved configurations provided that the cross sectional thickness is maintained after forming. Since it is necessary to provide different spectral transmissions to suit different applications, a dilution schedule can be developed to allow the user to adjust the spectrophotometric transmittance of the material to exact specifications.

Figure 3:
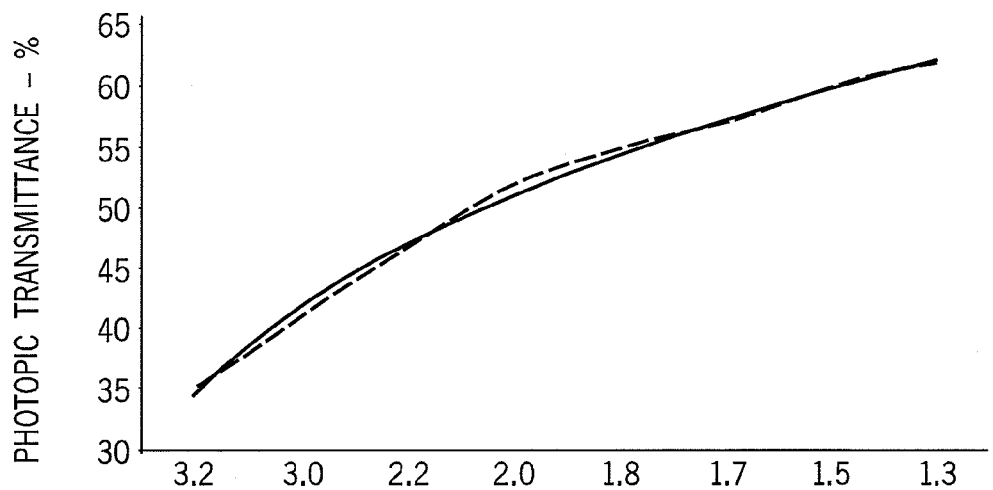
FIG. 3 is graphical representation of the relationship of the photometric transmission of a polymeric optical filter versus the cross sectional thickness of the filter.
Figure 4:
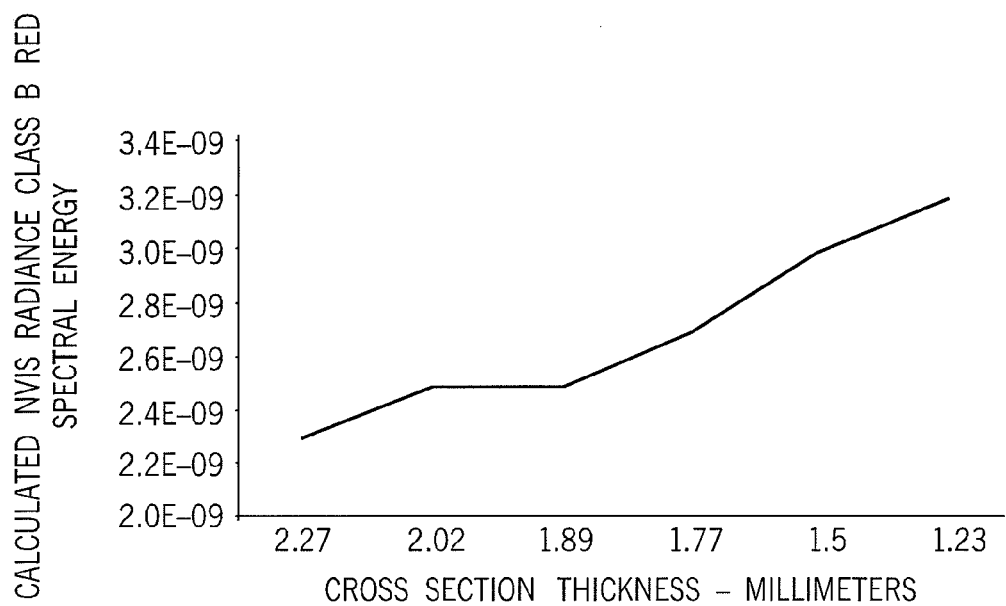
FIG. 4 is a graphical representation of the relationship of the Class B red spectral energy versus the cross sectional thickness of the filter.
Figure 9:
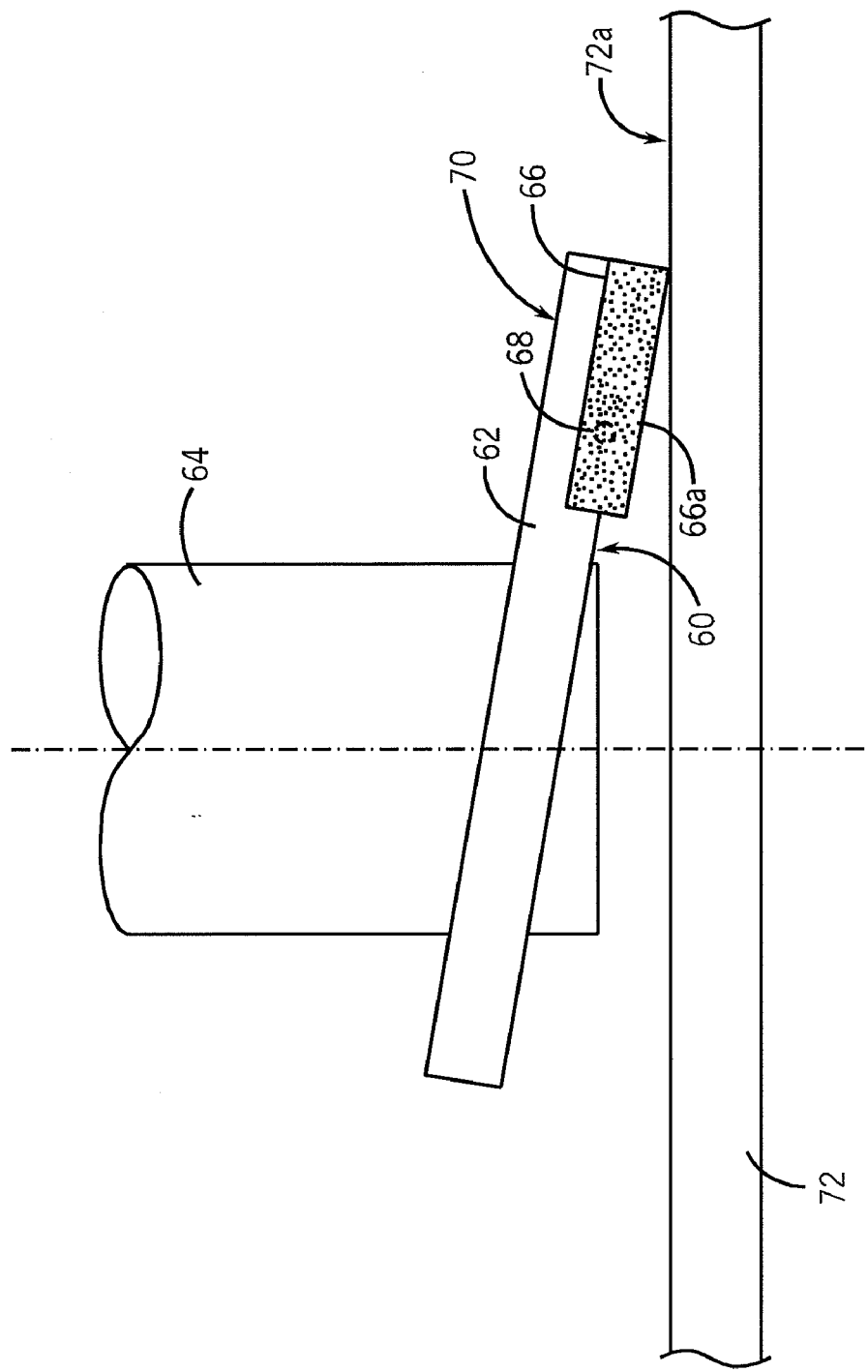
FIG. 9 is a schematic view of a cutting tool for conducting mechanical dilution of a polymeric optical filter.

To accomplish dilution of a thermally stabilized flat sheet, a machining process is used to remove material from the flat sheet until a desired cross sectional thickness is accomplished, thereby forming the desired filter. By way of example, FIGS. 3-4 show the absorption properties of a sample sheet of material. More specifically, FIG. 3 is graphical representation of the photopic transmittance of a sample sheet of material versus the thickness of the sheet of material. FIG. 4 is a graphical representation of the product of the red spectral response of a standard class B NVD and the spectral radiance of the filtered light source (calculated NVIS radiance of class B, red spectral energy of a sheet of a material) versus the thickness of the sheet of material. It is noted that the rate of change of the red spectral energy transmitted through the material is somewhat insensitive to the thickness of the material. As such, by reducing the thickness of the material, a user may increase the red spectral energy passing through the material and improve the color saturation without harming the overall suppression characteristics of the material. Referring to FIG. 9, it is particularly advantageous to remove small amounts of material per cycle with cutting tool 60. Cutting tool 60 includes arm 62 operatively connected to a slotted cylindrical clamp or collet 64 of a milling machine. Blade 66 is connected to by fastener 68 to first end 70 of arm 62.

In order to machine sheet 72, edge 66a of blade 66 of cutting tool 60 engages upper surface 72a of sheet 72. Thereafter, cutting tool 60 is rotated in a circular pattern parallel with upper surface 72a of sheet 72. The size and shape of blade 66 is such that when edge 66a of blade 66 engages upper surface 72a of sheet 72, a circular furrow matching the length of the reach of the blade 66 and corresponding diameter of the blade path is created. The shape of the furrow is slightly beveled radially inward to upper surface 72a of sheet 72. As the tool transverses upper surface 72a of sheet 72, a series of circular furrows are created until the entire surface area of upper surface 72a of sheet 72 has been removed. This process will repeat until a desired amount of material has been removed from sheet 72 such that sheet 72 has the desired cross sectional thickness.

It should be understood that the amount of material thickness removed per rotational cycle could range from one thousandths of an inch to five one thousandths of an inch. It is contemplated for the reach of blade 66 of cutting tool 60 to cover an effective area of a diameter of six inches with a sweep or feed rate of one inch per second. The rotational speed of cutting tool 60 is preferably between 1100 and 1700 revolutions per minute (RPMs). This process results in less friction and ultimately less distortion damage to sheet 72. If required, restoration of the original surface quality may be performed.

To restore the machined surface of sheet 72 to that of its original surface quality, the machined surface is subjected to a lap polishing apparatus utilizing approximately 40 grams of aluminum oxide based polishing compound and tap water. During the polishing process, sheet 72 is subjected to a slight pressure, e.g. approximately twelve pounds per square inch (PSI), and is rotated, e.g. at approximately 150 RPMs at a feed rate of four minutes per inch. As a result, the machined surface of sheet 72 is restored to better than eight micro inches surface roughness.

It is contemplated that other surface finishes can be applied to upper surface 72a of sheet 72 if desired. Surface finish alteration may include abrasion blasting or additional machining to form hard geometrical patterns such as pyramidical or prismatic structures therein. It is particularly advantageous to effect changes in material thickness by mechanical dilution to accomplish smaller cross sections. This method allows the sheet to be reduced in thickness by a factor of approximately five times from its initial thickness. It should be appreciated that spectrophotometric variability by mechanical dilution far exceeds the ability of chemical methods to provide the same spectrophotometric variability. It is believed that the physical stability of the sheet would be compromised due to certain loss factors such as incomplete polymerization promoted by forming thin cross sections with the same formulated density.

It should also be understood that by managing only that portion of the spectral radiance distribution of the light source that resides in the region of sensitivity of the particular NVD, a higher photopic transmittance results. This, in turn, provides higher zone illumination with a spectral irradiance capable of allowing the reflection of colored objects. It can be appreciated that in providing specific suppression of light energy at wavelengths known to contribute the greatest influence to NRi, the entire spectrum is not radically attenuated. Suppression methodology, as discussed herein, could be further understood as being selective wherein specific spectral transmittances are established. Generally, in absorption based optical filters, a sharp truncation or steep cut-off of the spectrum remains difficult to accomplish. Since the absorption characteristics of the filter provide some attenuation and truncation, it is the slope of the truncating curve and the transmitted spectral power that determines the overall NRi influence. It should be recognized that the spectral radiance of a white fluorescent light source has light energy emission in the region of sensitivity of NVD, thus it becomes essential to not only manage that spectral portion of the light source to optimize suppression, but also to accomplish it without too much degradation to the visible spectrum. If the corresponding truncated transmitting bandwidth is well centered and engulfs around the photopic and scotopic human eye efficiency response curves, the resultant spectral distribution of the filtered light source would result in higher daytime luminance and improved visual clarity by the non-NVD wearer at nighttime.

Figure 5:
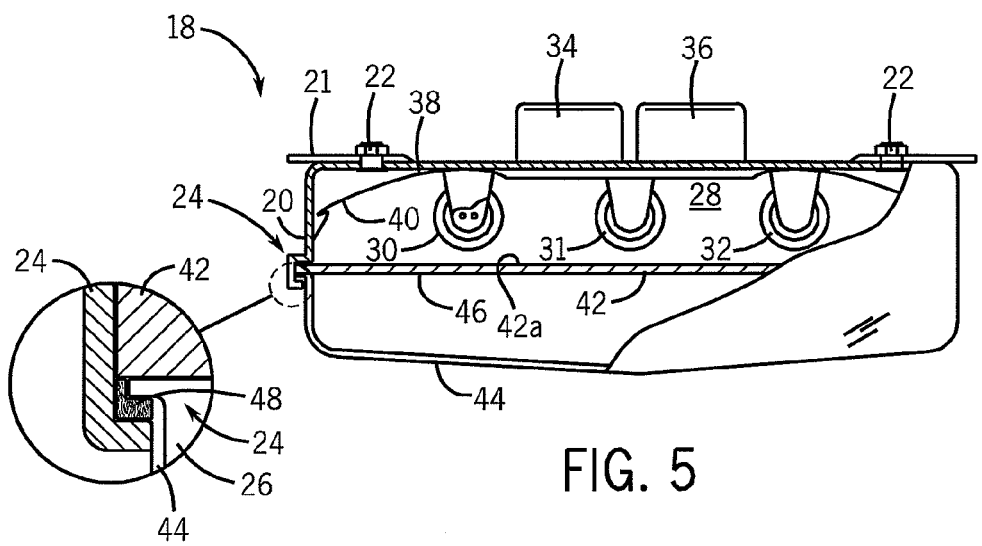
FIG. 5 is an end view, partially in section, depicting a light fixture assembly incorporating a filter fabricated from a polymeric optical medium with selective absorption under fluorescent backlighting.

The overall light energy management of the method heretofore described allows for the suppression bandwidth (600 nm-900 nm) to be accomplished through high-energy infrared absorbing dyes wherein the absorption characteristics of the dyes are well matched to that of the NVD spectral response of the image intensifier. It can be appreciated that improved color transmission of the filter when affixed to the appropriate light source would result in providing enough spectral energy to adequately make visible many reflective colors including yellow, orange and red tones. Hence, in order to provide a spectral irradiance of a color that could be perceived as-white light, it is contemplated to incorporate the filter heretofore described into a fluorescent light fixture assembly. Referring to FIG. 5, light fixture assembly 18 is defined by rectangular housing 20 mountable to an upper supporting surface such as ceiling 21 by a plurality of fasteners 22. Housing 20 includes a generally c-shaped, lower edge 24 defining opening 26. Opening 26 communicates with chamber 28 within housing 20. A plurality of lamps 30-32 are positioned with chamber 28 of housing 20. By way of example, lamps 30-32 may take the form of commercial fluorescent lamps rated for cool white illumination of approximately 4400 Kelvin. As is conventional, lamps 30-32 may be operatively connected to a power source through ballasts 34 and 36.

Specular reflector 38 is disposed between inner surface 40 of housing 20 and the plurality of lamps 30-32. It is intended for reflector 38 to reflect light emanating from lamps 30-32 toward opening 26 in housing 20. Filter 42 is disposed in opening 26 of housing 20 such that the outer periphery of filter 42 is received within c-shaped lower edge 24 of housing 20. Clear prismatic cover 44 is positioned on outer side 46 of filter 44 such that the outer periphery of cover 44 is also seated within c-shaped lower edge 24 of housing 20. To prevent unfiltered light leakage from light fixture assembly 18, integral gasket 48 is disposed between the outer periphery of clear prismatic cover 44 and a portion of inner surface 24a of c-shaped lower edge 24 of housing 20.

It is contemplated to fabricate filter 42 from a polymerized methlymethacrylate (PMMA) compound with a series on colorants and infrared absorbing dyes having a predetermined cross-sectional thickness, e.g., approximately 3.0 millimeters. The cross-sectional thickness of filter 42 is then mechanically diluted, as heretofore described, in order to provide different spectral irradiance characteristics for the different sources of illumination and levels of intensity if desired. It can be appreciated that filter 42 may be formed from other materials, such as polycarbonate resin, without deviating from the scope of the present invention. However, use of other mediums, such as glass, is discouraged in certain environments wherein the fragile nature of the material and the possible exposure to high shock and vibration could damage the filter.

Further, it can be appreciated that PMMA compounds composed of a second color could be bonded to filter 42 to extend or augment the desired performance of filter 42. It is contemplated to allow a provision of a second color spectrophotometric transmittance as to further extend the final chromatic capability of the source to produce individual NVD passive and tolerant colors such as blue, green, yellow, orange and red. The second color could be incorporated into a polymerized dye formed as a second sheet or as part of the initial compounding with the high-energy infrared absorbing dyes. Due to concerns regarding the lack of full polymerization with the various concentrations of dyes within a given sheet, it is particularly advantageous to incorporate a second color as a second sheet when fabricating the variant. It should be understood that the addition of a second color photometric transmittance affects changes only to the remaining visible portion of the spectrum to compensate for minor chromatic losses created by the first color. The second color would tend to reduce the light transmission of the first color transmittance. Care is taken to appropriately blend the two transmittances such that the final light transmission was kept closely to the first color transmittance. It should be recognized that the second color could be dye or pigment that cooperates in the production of the final chromatic output. Also, it is contemplated to fabricate filter 42 with light diffusing prismatic surface features or to impregnate filter 42 with light diffusing particulate matter. With the introduction of light diffusion features in filter 42, prismatic cover 44 could be replaced or eliminated.

When the plurality of lamps 30-32 are energized, light being of a color temperature of approximately 4400 Kelvin propagates and reflects off specular reflector 38 and off adjacent portions of inner surface 40 of housing 20 towards upper surface 42a of filter 42. As depicted in FIG. 3, when the light refracts through filter 42, the interaction of the collective dyes which make up filter 42 impose changes on the naturally propagated and reflected condition of the fluorescent light rays such that filter 42 effectively absorbs light energy at various, user desired wavelengths.

The CIE color system was devised and adopted by the Commission Internationale de l'Eclairage or The International Commission on Illumination in 1931 and has since become an international standard for measuring, designating and matching colors. In the CIE system, the relative percentages of each of the theoretical primary colors (X red, Y green, Z blue) of a color to be identified are mathematically derived as a coordinate pair (CIE x,y) and then plotted on a two dimensional coordinate diagram where the coordinate intersection will be a graphic representation of the chromaticity of a given color in relation to the three theoretical primary colors. By way of example, it has been found that in circumstances wherein the chromaticity of the light impinging at upper surface 42a of filter 42 is approximately equal to 1931 CIE color coordinates of x 0.38, y.37, also known as cool white fluorescence, the photopic transmittance of filter 42 was 39% and the color of the irradiated light was is approximately equal to 1931 CIE color coordinates of x 0.447, y.04. Hence, the departure from the initial lamp chromaticity is relatively minor and the irradiated final chromaticity of the converted light remains reasonably white. As a consequence, improvement to the photopic transmittance of filter 42 results in higher zone illumination.

It is noted that the fluorescent light rays emanating directly from lamps 30-32 are have a slightly different dominant wavelength than those light rays reflected from specular reflector 38 or inner surface 40 of housing 20. Certain commercially available paints may be used to coat specular reflector 16 and interior surface 40 of housing 20 to create a condition of complimentary long wavelength fluorescence. Long wavelength fluorescence occurs from the excitation of molecules that make up the coating or paint and could influence the amount of NRi irradiated from the light fixture assembly. However, because the orientation of filter 42 is optically perpendicular to the light rays emanating from lamps 30-32, any fluorescence emanating from the painted or coated surfaces of the interior of light fixture assembly 18 would be managed through the absorption process of the integral dyes, and therefore, negligible influence to the NRi irradiance would be apparent.

Figure 6:
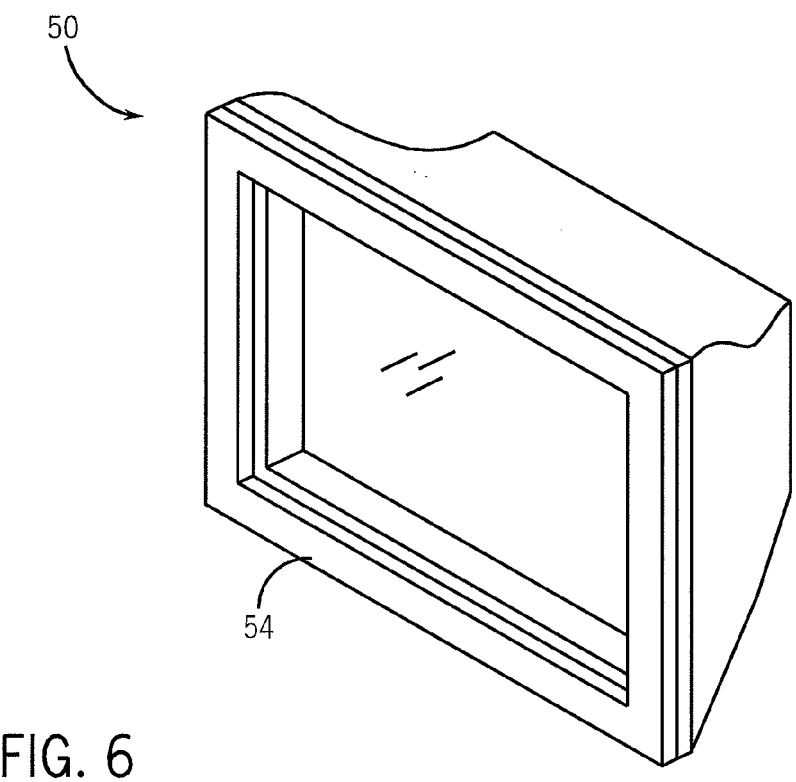
FIG. 6 is an isometric view of a night vision compatible, multi-color generating electronic optical display having a polymeric optical filter attached thereto.
Figure 7:
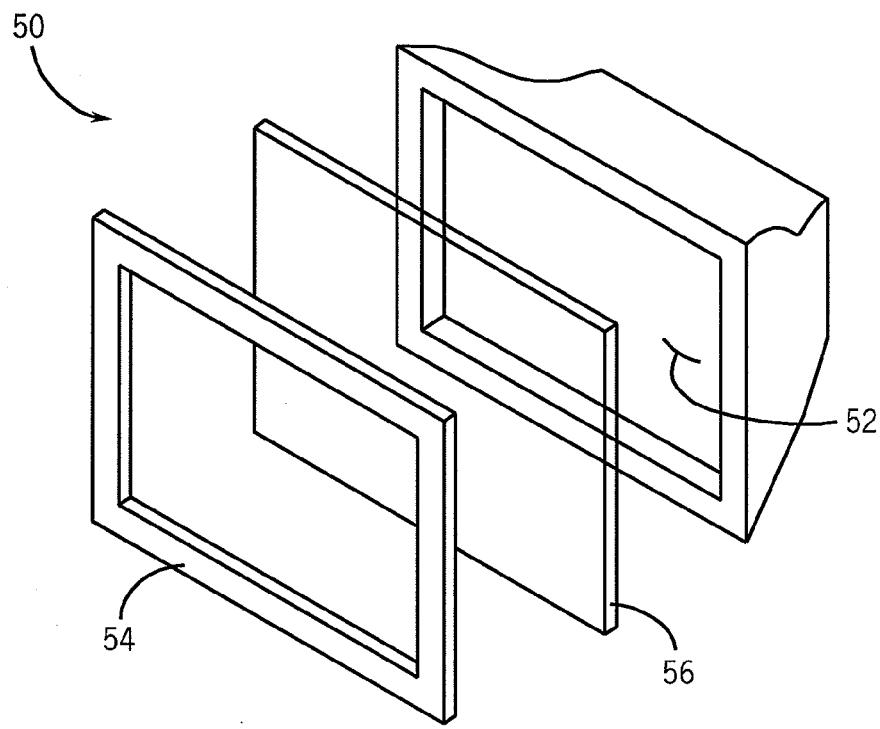
FIG. 7 is an exploded view of the optical display of FIG. 6.

It can be appreciated the filter heretofore described may be incorporated into various spectral emitter devices to provide a night vision friendly environment. Referring to FIGS. 6-7, by way of example, a multi-color generating electronic optical display utilizing the filter heretofore described is generally designated by the reference numeral 50. Display 50 may take the form of a CRT or LCD display operatively connected to a central processing unit and intended to generate multi-colored graphics. However, other types of displays may be used without deviating from the scope of the present invention.

It can be appreciated that a heavily attenuated monochromatic filter employed to render a multi-colored electronic display with the capability of NVC, would tend to remove the desired color pallet unless a provision in the design of the optical transfer function was to restore a desired pallet. As such, any filter intended to produce cooperative NVC filtering for applications of multi-colored displays and local emitters must have high transmittance characteristics to insure the proper light levels are met for good daytime readability. Further, the departure from the original chromaticities of the colors of the display should be relatively small after the treatment of the initial multi-colored spectrum.

Multi-color generating electronic optical display 50 includes screen 52 of a predetermined diagonal size, e.g. 21 inches. Bezel 54 surrounds the outer periphery of screen 52 to either limit or promote wide-angle viewing. Filter 56 is disposed between the screen 52 and the bezel 54. It can be appreciated that bezel 54 is affixed to the outer periphery of screen 52 in such a manner as to prevent the unfiltered leakage of light from passing therebetween.

As heretofore described, filter 56 is fabricated from a polymerized methlymethacrylate compound incorporating a series of colorants and infrared absorbing dyes. Alternatively, it can be appreciated that filter 56 can be fabricated from other materials, such as a polycarbonate resin, without deviating from the scope of the present invention. However, fabricating filter 56 from other mediums, such as glass, should be discouraged if it is intended to utilize multi-color generating electronic optical display 50 in an environment wherein exposure to high shock and vibration could damage the filter.

Filer 56 has a predetermined cross-sectional thickness, e.g. approximately 1.5 millimeters. It can be appreciated that the cross-sectional thickness of filter 56 could be altered in order for filter 56 to provide different spectral irradiance characteristics for different sources of backlighting illumination and for different desired levels of transmitted intensity. More specifically, in order to effectuate changes in the desired photometric transmittance or spectral composition, mechanical dilution is used. The dilution characteristics are based on the initial dye composition and strength factors established by a predefined spectral transmission and subsequent formulated optical density.

Figure 11:
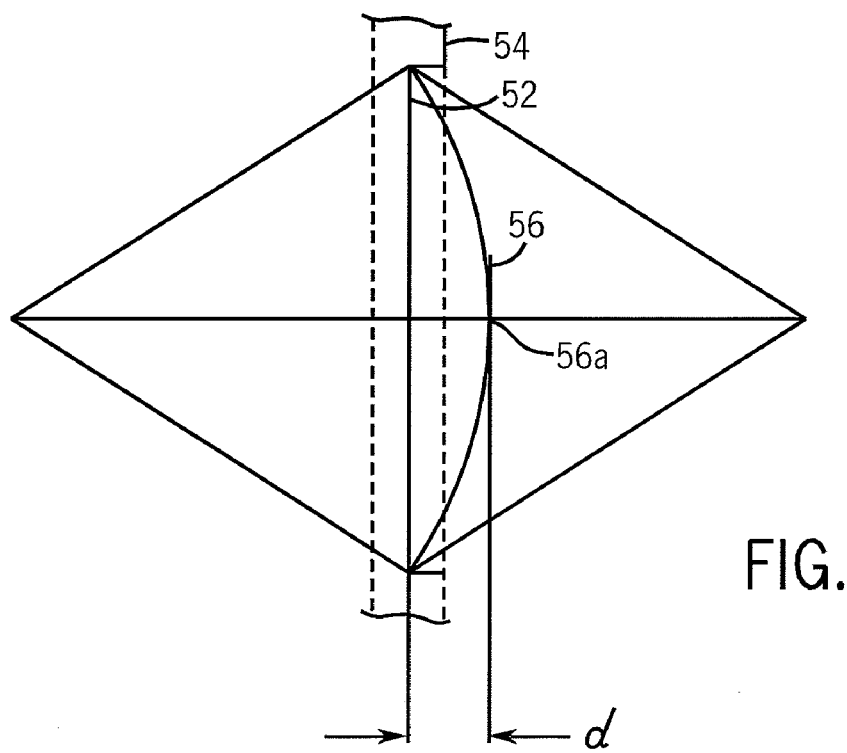
FIG. 11 is a schematic view of a monitor enclosure incorporating a filter fabricated from a polymeric optical medium with selective absorption versus the wavelengths of an optical spectrum.

As best in FIG. 11, it is contemplated that in covert NVC applications, a slight curvature may be provided in filter 56 in order to intentionally limit the viewing angle if the portable display equipment was engineered for night operation in the field. In the depicted embodiment, apex 56a of filter 56 is a distance "d" from screen 52. It should be understood that while under covert field operations, the scope of duty might cause for the deployment of the portable display equipment to be in very close proximity to enemy forces. As such, to effectively manage the optical signature that would emanate from a portable display device, considerations as to the luminance level, spectral irradiance and viewing angle must be made.

Since it is necessary to provide different spectral transmissions to suit different applications, a dilution schedule may be constructed to allow a user to adjust the photometric transmittance or spectral response of the material to exact specifications. To accomplish dilution of a thermally stabilized flat sheet, a machining process removes material until the exact cross sectional thickness is accomplished. As heretofore described, the inherent absorption properties of the material from which filter 56 is fabricated have been set to allow the deliberate removal of material to promote variable transmittance. It is particularly advantageous to remove small amounts of material per cycle with the cutting tool following in a movement of a circular pattern parallel with the surface of the material. This process results in less friction and ultimately less distortion damage to the material. If required, restoration of the original surface quality may be performed.

It is further contemplated that a series of filters 56 could also be stacked to achieve different ranges of photometric transmittance or to provide different levels of NRi management. It is also further contemplated that a filter could be constructed to manage the NRi of a monochromatic display. It is understood that the amount of NRi emitted from filter 56 varies as a function of the colors and relative luminance of the colors being generated by display screen 52. It is known that the amount of pixel NRi radiated by an electro-optical display that is comprised of a liquid crystal display (LCD) matrix is highest when the color red is made to appear from the active LCD matrix. The color red has a chromaticity value made up of the corresponding color component ratios that are in cooperation with the luminous states of each of the three color primaries which comprise the LCD matrix. It should be appreciated that since the energy contribution of the blue and green tristimulus components is essentially null, the color red is made to appear. As such, the greatest amount of NRi radiated by the LCD is the quantity of near infra red when the active LCD elements representing blue and green are at extremely low pixel luminances. It should be understood that the methodology to drive multi-colored electro-optical displays is specified in terms of three digital-to-analog conversion (DAC) values—one each for red, green and blue. These values range from 0 to 255 and the color is typically specified in CIE x, y coordinates, as heretofore described. It is the ratio of each of three colors that determine the output color of the display. The luminance component of color is specified in candela per square meter. It should also be understood that DAC values provide for the specific generation of calibrated colors required by a display system.

The spectral characteristics of filter 56 after excitation by a multi-colored backlight can be further customized. FIG. 8 depicts the intentional changes in spectral transmission characteristics of the filter for the creation of a relatively neutral density color transmission as a function of cross sectional thickness. It can be observed that very little change in near infrared area has occurred.

It can be appreciated that the filter of the present invention may be used in a wide variety of product for a wide variety of applications. By way of example, it is contemplated to incorporate the filter of the present invention to various products including, but not limited to, the following: vehicle exterior lighting; navigation aids; flood lighting; jump lighting; map lights; runway beacons; wands; emergency exit lighting; portable lighting fixtures; portable instrumentation; and in deck lighting. However, other products and applications are possible without deviating from the scope of the present invention.

Various modes of carrying out the invention are contemplated as being within the scope of the following claims particularly pointing out and distinctly claiming the subject matter which is regarded as the invention.

I claim:

1. A method of suppressing a predetermined portion of an optical spectrum emanating from a light emitter, comprising the steps of:
    fabricating a filter to absorb the predetermined portion of the optical spectrum, the filter having a spectrophotometric transmittance; and
    varying spectrophotometric transmittance of the filter.

2. The method of claim 1 wherein the step of fabricating the filter includes the step of forming a sheet having a predetermined cross sectional thickness.

3. The method of claim 2 wherein the sheet is fabricated from a polymer incorporating a series of colorants and infrared absorbing dyes.

4. The method of claim 2 wherein the step of varying spectrophotometric transmittance of the filter includes the step of removing a portion of the cross sectional thickness of the sheet.

5. The method of claim 4 wherein the sheet is partially defined by first and second surfaces and wherein the step of removing a portion of the cross sectional thickness of the sheet includes the step of cutting the first surface of sheet in a circular pattern so as to define a modified surface.

6. The method of claim 5 comprising the additional step of restoring the modified surface.

7. The method of claim 1 wherein the predetermined portion of the optical spectrum absorbed by the filter is in the range of 600 nanometers to 900 nanometers.

8. The method of claim 1 comprising the additional step of providing a curvature in the filter.

9. A method of suppressing a predetermined portion of an optical spectrum emanating from a light emitter, the optical spectrum illuminating an illumination area, comprising the steps of:
    fabricating a filter having a spectrophotometric transmittance;
    varying the spectrophotometric transmittance of the filter; and
    positioning the filter between the light emitter and the illumination area, the filter absorbing the predetermined portion of the optical spectrum.

10. The method of claim 9 wherein the step of fabricating the filter includes the step of forming a sheet having a predetermined cross sectional thickness.

11. The method of claim 10 wherein the sheet is fabricated from a polymer incorporating a series of colorants and infrared absorbing dyes.

12. The method of claim 9 wherein the step of varying the spectrophotometric transmittance of the filter includes the step of removing a portion of the cross sectional thickness of the sheet.

13. The method of claim 12 wherein the sheet is partially defined by first and second surfaces and wherein the step of removing a portion of the cross sectional thickness of the sheet includes the step of cutting the first surface of sheet in a circular pattern so as to provide a modified surface.

14. The method of claim 13 comprising the additional step of restoring the modified surface.

15. The method of claim 9 wherein the predetermined portion of the optical spectrum absorbed by the filter is in the range of 600 nanometers to 900 nanometers.

16. The method of claim 9 comprising the additional step of providing a curvature in the filter.

17. A method of suppressing a predetermined portion of an optical spectrum emanating from a light emitter, the optical spectrum illuminating an illumination area, comprising the steps of:
    fabricating a filter having a predetermined cross sectional thickness and a spectrophotometric transmittance; and
    reducing the cross sectional thickness of the filter.

18. The method of claim 17 wherein the step of reducing the cross sectional thickness of the filter includes the step of cutting the filter in a circular pattern.

19. The method of claim 17 comprising the additional step of positioning the filter between the light emitter and the illumination area, the filter absorbing the predetermined portion of the optical spectrum.

20. The method of claim 19 wherein the predetermined portion of the optical spectrum absorbed by the filter is in the range of 600 nanometers to 900 nanometers.

21. The method of claim 17 comprising the additional step of providing a curvature in the filter.

* * * * *